United States Patent Office 2,775,634
Patented Dec. 25, 1956

2,775,634

REMOVAL OF ACETYLENE FROM OLEFINS BY SELECTIVE HYDROGENATION

Gene Nowlin, Bartlesville, Okla., assignor to Phillips Petroleum Company, a corporation of Delaware No Drawing. Application June 22, 1953,
Serial No. 363,400

17 Claims. (Cl. 260—677)

This invention relates to a selective hydrogenation of an acetylene in the presence of olefins employing a catalyst novel for this purpose and the purification of olefins and/or diolefins which are contaminated with an acetylene or an acetylenic compound. In one of its aspects the invention relates to the selective hydrogenation of acetylene contained as an impurity in a hydrocarbon stream containing essentially olefins. In another aspect the invention relates to the selective hydrogenation of vinylacetylene or other derivatives of acetylene contained in a hydrocarbon stream which can contain a substantial quantity or proportion of a diolefin, for example, butadiene. In still another aspect, the invention relates to the selective hydrogenation of an acetylenic compound contained in an olefin-containing, or diolefin-containing hydrocarbon stream in the presence of a catalyst containing essentially iron and at least one of chromia and potassium, the latter being present as the hydroxide or carbonate. In still another aspect of the invention, a selective hydrogenation catalyst which is employed according to the invention is obtained by reducing in the presence of hydrogen at an elevated temperature iron oxide combined with at least one of chromium oxide and an alkalizing agent.

One of the usual methods for manufacturing olefins comprises passing a material, such as ethane, propane, butane, kerosene, or other mineral oil fractions through a zone heated sufficiently to decompose such material with formation of hydrogen and one or more unsaturated compounds. Pyrolyses of the type just mentioned have been carried out at temperatures ranging from about 930° F. to about 2200° F., but the per pass yield of olefinic products is usually highest when operating at temperatures above 1100° F., e. g., between 1100 to 1800° F. The yield of acetylenic by-products becomes appreciable when operating at pyrolysis temperatures above 1100° F., i. e., within the temperature range at which the olefins are usually produced in maximum yield.

Acetylenic materials frequently interfere with subsequent reactions in which olefinic products containing the same are to be employed and various methods for removing such materials from olefin-containing mixtures have been proposed.

The cracked-gas mixture obtained by pyrolyzing mineral oil fractions or other aliphatic hydrocarbons at temperatures above 1100° F. comprises not only gaseous olefins but also hydrogen, acetylenic compounds, saturated hydrocarbons, and other gases. The hydrogen is usually present in an amount sufficient to saturate a substantial proportion of the unsaturated hydrocarbons in the gas and is always in considerable molecular excess over the acetylenic compounds.

A process employing a catalyst which exerts a selective hydrogenation effect over a wide range of temperatures would be highly desirable especially in view of the exothermic nature of the hydrogenation.

I have discovered that by contacting a gas mixture as herein described with certain hydrogenation catalysts under the operating conditions hereinafter described the acetylenic compounds therein contained are selectively hydrogenated over a broad range of temperatures to form olefins, thereby removing said acetylenic compounds from the mixture and increasing the yield of olefins and/or diolefins therein. During such operation the olefins and diolefins present in the gas are not appreciably hydrogenated and the hydrogenation of the acetylenic compounds apparently stops with the formation of olefins or diolefins. Among the acetylenes which may be present in a gas treated according to the present invention are acetylene, methylacetylene, ethylacetylene, dimethylacetylene, vinylacetylene and diacetylene.

According to this invention, an acetylene-containing gas is contacted under hydrogenating conditions with a catalyst prepared by reducing a mass obtained by promoting iron oxide with at least one of potassium oxide and chromium oxide. The now preferred catalyst, prior to reduction, at a temperature in the range 650–1300° F. in presence of hydrogen, contains $Fe_2O_3$—$Cr_2O_3$—$KOH$. In the presence of carbon dioxide the KOH is converted to $K_2CO_3$. Concentrations of from 1 to about 70 mol percent of $Cr_2O_3$ are operative, the remainder being alkalized iron oxide. Iron oxide will, preferably, constitute the preponderant proportion of the catalyst and preferably will be in excess over all other constituents combined with the possible exception of a diluent. A now preferred catalyst will contain approximately 65–95% by weight of iron oxide. The concentration of alkali, calculated as the oxide, ranges from 0.2–5 weight percent.

Catalysts according to the invention can be prepared by mixing or grinding or promoting iron oxide with chromium oxide and incorporating therein a suitable inorganic alkalizing agent, for example, one or more of the common alkalis, e. g., oxides, hydroxides and/or salts (e. g. carbonates) of the alkali metals or even alkaline earth metals; thus a salt which is decomposable to the oxide is ordinarily employed. In the case of the alkaline earth compounds, salts hydrolyzable to the hydroxide may be used when water is added in the process of catalyst manufacture, e. g., just prior to extrusion. Thus, the salt is ultimately decomposable to the oxide when the catalyst is heated at an elevated temperature. Herein and in the claims the various compounds of potassium here mentioned are represented by potassium hydroxide. A suitable mixture of nitrates can be thermally decomposed followed by ignition and finally by a reduction at about 850–1000° F. in an atmosphere of hydrogen. Coprecipitation methods, for example coprecipitation of hydrous gels or oxides or sols can also be employed. One skilled in the art can determine by mere routine test the optimum composition, starting materials and modus operandi which yield the desired results in any particular case. Surface area and characteristics can affect the degree of selectivity of some catalysts and, as will be understood by one skilled in the art, the ignition or calcination temperature as well as the reduction can be varied to obtain optimum results in the case of each catalyst and hydrocarbon stream treated. In one method of preparation the catalyst of the invention which contains iron, chromia and potassium compound is prepared by thoroughly admixing or grinding together iron oxide and chromium oxide, then forming a paste thereof with a solution of the desired potassium compound, for example, potassium hydroxide. Upon pelleting and drying, the catalyst can be ignited and then reduced at about 950° F. in hydrogen or the reduction can be accomplished directly upon pelleting. The catalyst can also be prepared by impregnation of the iron oxide with one of the alkali oxide-providing material and the chromia-providing material.

The iron oxide, which is admixed with the remaining catalyst ingredient or ingredients, can be prepared by calcining a precipitated iron oxide in the form of a powder at an elevated temperature, for example in the range 1475–1600° F. until its surface area has been reduced to below about 8 square meters per gram or until its apparent density is equivalent to about 250 pounds per barrel. At this stage the iron oxide is of a brownish-red color and has a formula of $Fe_2O_3$. Further calcination may be effected under reducing conditions in which event the iron oxide will be partly or completely in the form of black $Fe_3O_4$. Since the catalyst according to this invention is reduced at an elevated reducing temperature prior to use, the iron therein will be essentially in the form of elemental iron although there may be present some incompletely reduced iron oxide.

In the process for the selective hydrogenation of the acetylenic compounds in a gas mixture containing the same and also olefins and hydrogen in excess over that required to convert the acetylenes into olefins, the operating conditions which require control are the temperature at which the hydrogenation is carried out, the rise in temperature of the gas mixture which occurs during its passage through a bed of catalyst, and the rate at which the gas mixture is passed through the catalyst. As noted, a catalyst which can exert selectivity over a wide range of temperature is desirable since the changes in composition of gases fed thereto and/or the period of time of operation can result in rather wide temperature variations which otherwise can destroy the selectivity of the catalyst necessitating shut-down of the operation. Therefore, with the catalyst of this invention temperature control is not so critical as heretofore.

When using the selective hydrogenation catalysts of this invention, the operating conditions to be observed are:

(1) The temperature of the gas mixture during contact with the catalyst should be sufficient to cause reaction, say 250° F., but not above about 650° F. When a stream of hydrocarbons containing a substantial proportion of ethylene but low in $C_4$ olefinic hydrocarbons, e. g., diolefins, is treated the temperature will be in the range perferably 300–450° F., more preferably 330–430° F., since at higher temperatures the olefins as well as the acetylenes become hydrogenated and this secondary exothermic reaction, once started, usually causes overheating with resultant carbonization and frequent plugging of the catalyst and apparatus. When a substantial proportion of diolefins is contained in the stream treated, the temperature can and preferably will be higher than it is preferred for streams low in diolefins. Thus, the temperature when treating, say, a butadiene concentrate containing a $C_4$ acetylene will be preferably in the range 350–650° F., more preferably 400–600° F.

(2) The hydrogenation can be carried out at a pressure in the approximate range 0–900 p. s. i. g. The pressure will be preferably much lower when a substantial proportion of diolefinic hydrocarbons is present than when only minor proportions of them are present. When high proportions of, say, butadiene are present the pressure will be preferably in the range 0–175 p. s. i. g., more preferably 0–100 p. s. i. g.; whereas, when only minor amounts of diolefinic hydrocarbons are present the pressure will be preferably in the range 150–750 p. s. i. g., more preferably 300–500 p. s. i. g.

(3) The space velocity will be in the range 25 v./v./hr. to 2400 v./v./hr. For a stream high in diolefin content it will be preferably 25–500 v./v./hr., more preferably 50–300 v./v./hr. For a stream low in diolefin content it will be preferably 200–2000, more preferably 600–1000 v./v./hr.

(4) A feed stock containing a substantial quantity of ethylene or other olefin usually contains 10 to 30 mol percent ethylene or olefin, and less than 1.0 mol percent, usually less than 0.5 mol percent acetylene, and preferably less than 0.2 mol percent acetylene to avoid an excessive temperature rise, since the reaction is exothermic. The acetylene content can be adjusted by recycling priorly treated gases.

*Example I*

A feed stream containing 20 mol percent ethylene and 0.2 mol percent acetylene was selectively hydrogenated over a catalyst having a composition of 87 percent $Fe_2O_3$, 3 percent $Cr_2O_3$ and 10 percent KOH prior to its reduction by hydrogen at 950° F. After completion of the reduction treatment the feed stream was preheated and passed at a space velocity of 800 v./v./hr. through a reactor containing said catalyst maintained at a temperature of approximately 380° F. and a pressure of 400 p. s. i. g. This operation resulted in the removal of all of the acetylene from the feed stream without loss of any olefin. Selectivity of the catalyst remained substantially unimpaired at the end of the operation.

To demonstrate the action of the catalysts of this invention and the criticality of the qualitative compositions thereof and especially of the now preferred catalyst, according to the present invention, the following example records data obtained employing three catalysts, one containing iron oxide, potassium oxide and chromium oxide; another containing iron oxide and potassium oxide; and still another containing iron oxide and chromium oxide.

The potassium and chromium contents of the three catalysts are given in the following tabulation:

|  | Weight Percent Before Reduction | |
| --- | --- | --- |
|  | K | Cr |
| 1. Fe-K-Cr | 7 | 2 |
| 2. Fe-K | 8 | 0 |
| 3. Fe-Cr | 0 | 2 |

All three catalysts were reduced in hydrogen at 950° F.

All of the above-described catalysts and an unpromoted catalysts prepared by the reduction of mill scale ($Fe_3O_4$) with hydrogen were tested for selective hydrogenation of acetylene at 400 p. s. i. g. and 800 v./v./hr. gas space velocity. The composition of the feed stream was:

| Component: | Vol. percent |
| --- | --- |
| Acetylene | 0.1 |
| Hydrogen | 18.8 |
| Methane | 35.5 |
| Ethylene | 21.7 |
| Ethane | 5.8 |
| Propane | 7.1 |
| Propylene | 8.6 |
| Butadiene | 0.3 |
| Butylenes | 0.2 |
| Butanes | 1.2 |

The effluent mixture was tested for acetylene by the Illosvay test. The experimental results are given in tabular form below.

| Catalyst | Minimum Temp. for complete $C_2H_2$ hydrogenation, °F. | Unsaturates Loss [1] |
| --- | --- | --- |
| Fe | Complete hydrogenation at room temperature. | All hydrogen consumed. |
| Fe-Cr | 320 | Increased regularly from 3% at 320° F. to 8% at 392° F. |
| Fe-K | 230 | Increased regularly from 1% at 230° F. to 7% at 330° F. |
| Fe-Cr-K | below 298 | None up to 420° F. Constant at 1 to 2% between 420 and 600° F. |

[1] Volume percent of the unsaturates present in the feed.

While the Fe-K catalyst (2) appeared to be as selective as Fe-K-Cr (1) at a temperature in the neighborhood of 230° F., the constant high selectivity of (1) over a wide range of temperatures is a distinct advantage in view of the exothermic nature of hydrogenation, as discussed elsewhere herein.

*Example II*

A butadiene concentrate containing vinylacetylene and having the following composition, see table below, at a space velocity of 109.5 v./v./hr. (STP) was passed over a reduced catalyst which, prior to its reduction in a pure stream of hydrogen in the temperature range 662–842° F., contained 3 percent chromium oxide, 10 percent potassium hydroxide, and 87 percent iron oxide. As can be noted, the $C_4H_6$ (butadiene) content of the effluent stream was substantially that of the feed; the run was made at atmospheric pressure, at the indicated temperatures and lasted about three hours. When a sample had been taken at one temperature, the system was lined out at the next higher temperature and then the next sample was taken, etc.

| Operating Temperature Component | Mixed feed | Mols per 100 mols of mixed feed | | |
|---|---|---|---|---|
| | | 100 C. (212 F.) | 200 C. (392 F.) | 300 C. (572 F.) |
| $H_2$ | 5.8 | 8.6 | 7.8 | 10.0 |
| $CH_4$ | 1.1 | 1.6 | 1.5 | 1.8 |
| $C_2H_3$* | 0.3 | 0.2 | 0.2 | 0.2 |
| $C_3H_7$** | 0.2 | 0.1 | 0.1 | 0.1 |
| $C_4H_4$ | 2.9 | 1.0 | 0.6 | 0.1 |
| $C_4H_6$ | 39.6 | 41.1 | 41.1 | 40.7 |
| $C_4H_8$ | 49.0 | 49.7 | 50.1 | 50.9 |
| CO | 0.1 | | | |
| $CO_2$ | 1.0 | | | |
| | 100.0 | 102.3 | 101.4 | 103.8 |
| Percentage $C_4H_4$ removal | | 65.5 | 79.5 | 96.5 |

* Ethane plus ethylene.
** Propane plus propylene.

It is noted that the vinylacetylene, originally 2.9 mol percent, was reduced to 1.0, 0.6 and 0.1 mol percent, respectively; while the butadiene, originally 39.6 mol percent, was actually somewhat increased in the effluent over its original value in the feed, to 41.1, 41.1 and 40.7 mols percent, respectively.

Reasonable variation and modification are possible within the scope of the foregoing disclosure and the appended claims to the invention, the essence of which is that a reduced iron oxide hydrogenation catalyst can be made selective over a wide range of temperatures for the hydrogenation of an acetylene contained in a hydrocarbon stream containing a large proportion of an unsaturated material, for example ethylene or butadiene, and hydrogen, by promoting it with at least one of a suitable alkalizing agent and chromium oxide and that when the iron oxide is promoted with both an alkalizing agent, e. g., potassium oxide, and chromium oxide the selectivity for acetylene hydrogenation in said hydrocarbon streams is good and is maintained over a much wider range of temperatures, as disclosed herein, which is an important consideration in view of the exothermic character of the hydrogenation and the variations of gas stream compositions which are encountered in operation on a large scale especially in an oil refinery in which gases from several different operations in constantly varying proportions, each having varying analyses, are treated to remove selectively an acetylene therefrom.

I claim:

1. A selective removal of an acetylene from gases containing the same together with other gases which are capable of hydrogenation, in which the unsaturated component includes substantially only monoolefins, which comprises under hydrogenation conditions passing said gases containing hydrogen over a catalyst obtained by reducing in the presence of hydrogen iron oxide promoted with a suitable alkalizing agent and chromium oxide.

2. A process according to claim 1 wherein the catalyst prior to reduction contains by weight about 87 percent $Fe_2O_3$, about 3 percent $Cr_2O_3$ and about 10 percent KOH.

3. The selective removal of acetylene ($C_2H_2$) from a gas containing essentially only at least one of ethylene and propylene which are capable of hydrogenation, which comprises, under hydrogenating conditions, passing said gas containing hydrogen over a catalyst obtained by reducing in the presence of hydrogen iron oxide promoted with an alkalizing agent and chromium oxide.

4. The selective removal of acetylene ($C_2H_2$) from gases containing the same together with other gases which are capable of hydrogenation in which the unsaturated component includes substantially only monoolefins which comprises under hydrogenation conditions passing said gases containing hydrogen over a catalyst obtained by reducing, in the presence of hydrogen, iron oxide promoted with an alkalizing agent, which is at least one of an oxide, hydroxide and a salt of one of an alkali metal and alkaline earth metal, all but said oxide being ultimately decomposable to a corresponding oxide when the said catalyst is heated to an elevated temperature, and chromium oxide.

5. A selective removal of an acetylene from gases which are capable of hydrogenation in which there is included a substantial proportion of a monoolefin which comprises passing said gases containing hydrogen over a catalyst obtained by reducing in the presence of hydrogen a mass containing a preponderant proportion of iron oxide promoted with a suitable alkalizing agent and chromium oxide.

6. A process according to claim 5 wherein there is contained in said gases at least one of ethylene and propylene.

7. A process according to claim 6 wherein there is also contained in said gases a diolefin.

8. A process according to claim 5 wherein the alkalizing agent is one of an oxide, hydroxide and a salt of one of an alkali metal and alkaline earth metal which is ultimately decomposible to a corresponding oxide when the catalyst is heated to an elevated temperature.

9. A process according to claim 5 wherein the catalyst is prepared by impregnating sub-divided ferric oxide with a potassium compound and a chromium compound and then reducing with hydrogen the impregnated mass thus prepared.

10. A process according to claim 5 wherein the temperature is sufficient to initiate hydrogenation but is not substantially in excess of 650° F. and wherein the pressure is in the range of from about atmospheric to about 900 p. s. i. g.

11. A process for the selective hydrogenation of an acetylene contained in a hydrocarbon stream containing a substantial proportion of a monoolefin and also containing hydrogen, which comprises subjecting said stream to the action of a catalyst, obtained by promoting a major proportion of iron oxide with minor proportions of a chromium compound and a suitable alkalizing agent, and then reducing the mass thus obtained in hydrogen at a temperature in the range 650–1300° F.; the said stream being contacted with said catalyst at a temperature in the range 250–650° F.; the pressure being in the range atmospheric to 900 p. s. i. g. and the space velocity being in the range 25–2400 volumes of gas per volume of catalyst per hour and recovering a stream of hydrocarbons containing substantially less of said acetylene.

12. The selective removal of acetylene ($C_2H_2$) from a gas containing essentially only at least one of ethylene and propylene which are capable of hydrogenation, which comprises, under hydrogenating conditions, passing said gas containing hydrogen over a catalyst obtained by reducing in the presence of hydrogen iron oxide promoted with an alkalizing agent and chromium oxide.

13. The selective removal of acetylene ($C_2H_2$) from a gas containing at least one of ethylene and propylene which are capable of hydrogenation, which comprises, under hydrogenating conditions, passing said gas containing hydrogen over a catalyst obtained by reducing in the presence of hydrogen iron oxide promoted with an alkalizing agent and chromium oxide.

14. A process for the selective hydrogenation of an acetylene contained in a hydrocarbon stream containing at least one of ethylene and propylene and also containing hydrogen which comprises subjecting said stream to the action of a catalyst, obtained by promoting a major proportion of iron oxide with minor proportions of a chromium compound and a suitable alkalizing agent, and then reducing the mass thus obtained in hydrogen at a temperature in the range 650–1300° F.; the said stream being contacted with said catalyst at a temperature in the range 250–650° F.; the pressure being in the range atmospheric to 900 p. s. i. g. and the space velocity being in the range 25–2400 volumes of gas per volume of catalyst per hour and recovering a stream of hydrocarbons containing substantially less of said acetylene.

15. A process according to claim 14 wherein acetylene ($C_2H_2$) is contained in said gases and the temperature is in the range 300–450° F.; the pressure is in the range 150–750 p. s. i. g. and the space velocity is 200–2000 volumes of gas per volume of catalyst per hour.

16. A process for the selective hydrogenation of acetylene contained in a hydrocarbon stream containing a substantial proportion of ethylene and also containing hydrogen which comprises subjecting said stream to the action of a catalyst, obtained by promoting a major proportion of iron oxide with minor proportions of an alkali metal compound alkalizing agent and chromium oxide, the catalyst prior to reducing containing 69–95 percent by weight of iron oxide, the balance being constituted by said agent and said chromium oxide, and then reducing the mass thus obtained in hydrogen at a temperature in the range 650–1300° F.; the said stream being contacted with said catalyst at a temperature in the range 300–450° F.; a pressure in the range 150–750 p. s. i. g. and a space velocity in the range 200–2000 volumes of gas per volume of catalyst per hour.

17. A process according to claim 16 wherein the catalyst prior to reduction contains by weight about 87 percent $Fe_2O_3$; 3 percent $Cr_2O_3$ and about 10 percent KOH.

References Cited in the file of this patent

UNITED STATES PATENTS

| | | |
|---|---|---|
| 1,836,927 | Linckh et al. | Dec. 15, 1931 |
| 2,359,759 | Hebbard et al. | Oct. 10, 1944 |
| 2,378,969 | Bailey et al. | June 26, 1945 |
| 2,413,254 | Soday | Dec. 24, 1946 |
| 2,426,604 | Frevel | Sept. 2, 1947 |
| 2,451,327 | Fasce et al. | Oct. 12, 1948 |